United States Patent Office 3,560,234
Patented Feb. 2, 1971

3,560,234
PROCESS FOR THE MANUFACTURE OF PIGMENTS OF TITANIUM DIOXIDE IN THE RUTILE FORM
Raymond G. Holbein, Thann, France, assignor to Fabriques de Produits Chimiques de Thann et de Mulhouse, Thann, France
No Drawing. Filed Mar. 3, 1969, Ser. No. 803,938
Int. Cl. C09c 1/36
U.S. Cl. 106—300                         13 Claims

ABSTRACT OF THE DISCLOSURE

A titanium dioxide rutile pigment of good brightness, colour, and other favourable properties is made by adding a rutile seed to a titanium sulphate solution, hydrolysing the titanium sulphate to a hydrous titanium dioxide gel, adding further rutile seed (preferably prepared in a different way), an alkali metal compound, a zinc compound, and an unusually high proportion of phosphoric acid or a phosphate, drying the gel containing the additives, and calcining it, preferably at about 1000° C.

---

This invention relates to a process for the manufacture of titanium dioxide in the rutile form by hydrolysis of a solution of titanium sulphate and calcination of the resulting titanium dioxide gel.

Numerous processes have been recommended for obtaining a titanium dioxide of good pigment structure.

Thus, by adding small quantities of rutile-forming seeds and of zinc oxide or of various other substances to a titanium dioxide anatase gel the conversion to rutile has been achieved whilst preserving the fineness within wide limits. This conversion is carried out at a rather low temperature, e.g., 850° C., compared with a more usual temperature of about 950° C. for the calcination of anatase. This lowering of the calcination temperature is not always in itself desirable, since the higher the temperature at which the titanium dioxide is calcined under otherwise similar conditions, the more compact its structure, the less its sensitivity to photochemical influences and the less its oil absorption; all these are desirable properties. However, the lowering of the temperature in the above process is unavoidable because of the need to avoid a strong agglomeration of the product in the presence of these rutilisation catalysts, if the fineness and colour of the product are not to be adversely affected.

A process is also known in which the hydrate of titanium dioxide is calcined in the presence of rutile-forming titanium dioxide seeds at temperatures of 750° to 1000° C. until the material has been completely converted to rutile. In this process, known additives such for example as salts of alkali metals, alumina, zinc chloride, or other metal compounds are added to the titanium dioxide precipitate before or after the calcination. Naturally, the addition of these compounds after calcination can have no effect on the rutilisation. Their addition before calcination does give some improvement in the rutilisation, but this is insufficient to facilitate the subsequent grinding of the product.

Assignee's United States Pat. No. 3,169,074 describes a process for the manufacture of titanium dioxide pigments in the rutile form by hydrolysis of a titanium sulphate solution and simultaneous calcination of the resulting titanium dioxide hydrate, with the addition of rutile-forming seeds, and small amounts of aluminium salts and/or alkali metal salts. Thus a preformed aqueous suspension of rutile-forming titanium dioxide seeds is added to a solution of titanium sulphate, the latter is hydrolysed, and a further quantity of a suspension of seeds, advantageously obtained in a different manner, is added thereto as well as small amounts of an aluminium salt and/or alkali metal salt and/or a small amount of a phosphorus compound such as ammonium phosphate these additions being made to the gel of precipitated titanium dioxide hydrate after it has been washed; the gel is then dried and calcined at temperatures of about 1000° C. and above until conversion to rutile is practically complete. In this case the amount of $P_2O_5$ used varies from 0.1 to 0.5%, and preferably between 0.1 and 0.25%, on the titanium dioxide content of the product to be calcined.

It has now been found that in carrying out this process it is also possible to use zinc oxide or a zinc salt in place of aluminium oxide or an aluminium salt, provided the amount of $P_2O_5$ added is significantly increased, say up to 0.2 to 0.8% depending on the product desired.

Thus the invention comprises a process in which an aqueous suspension of preformed rutile-forming seeds is added to a titanium sulphate solution, the solution is then subjected to hydrolysis, the resulting gel is washed and a further suspension of rutile-forming titanium dioxide seed is added thereto, these fresh seeds advantageously being obtained in a different manner, and this addition being carried out in the presence of 0.1 or 0.2 to 2%, of a zinc salt (expressed as ZnO), 0.1 to 1.0% of alkali metal salt (expressed as $K_2O$), and 0.2 to 0.8% of a phosphorus compound (reckoned as $P_2O_5$) all percentages being relative to the titanium dioxide content of the product to be calcined, and the gel is dried and calcined at a temperature of about 1000° C., depending on the amounts of additives employed, until conversion to rutile is practically complete.

Preferably the phosphorus compound added is monoammonium phosphate, an amount of 0.3% (relative to the titanium dioxide) being very advantageous. The calcination temperature is adjusted as a function of the amount of additives used in each case.

In the known processes using zinc oxide, rutiles with coarse particles are generally obtained, giving a yellow undertone when used as pigments. It is consequently entirely surprising that by double rutile-forming seeding, that is to say a seeding both before hydrolysis and after hydrolysis but before calcination, using a higher $P_2O_5$ content that has been usual in the past, a product which leads to a pure undertone when employed in a white or coloured paint can be obtained by the use of zinc oxide or a zinc salt.

As regards other aspects of the process of the invention, reference may be made to assignee's United States Pat. No. 3,169,074 which describes the preparation of the seeds, the pigmentation agents, the amounts added, their effect and the role of the $P_2O_5$. All the explanations given there relating to the pigmentation agents or additives employed in the manufacture are valid for the present process.

The invention consists also in the rutile pigments obtained by the above process, which are distinguished by excellent physicotechnical and pigment characteristics including high brightness, white colour, high colour strength, low photochemical activity, good dispersibility in various media, and the ability to give paint with a pure undertone. The pigment is 100% rutile and contains from 0.3 to 1% of ZnO.

The invention is illustrated by the following examples:

EXAMPLE 1

16,000 l. of a titanium sulphate solution of the following composition are prepared by treating ilmenite with sulphuric acid:

|  | G./l. |
|---|---|
| $TiO_2$ | 244.8 |
| $Ti^{+++}$ (expressed as $TiO_2$) | 2.7 |
| Fe | 71.0 |
| Active $H_2SO_4$ (free acid plus acid bonded to the $TiO_2$) | 480.2 |

This solution is heated to a temperature of 95° C. A suspension of rutile-forming seeds prepared from titanium tetrachloride as described in assignee's United States Pat. No. 3,169,074 is introduced into the hot solution with continuous stirring over the course of ten minutes. The suspension of seeds for the hydrolysis has a concentration of 33 g./l. of $TiO_2$, and the volume of the suspension introduced is 2,970 l. The resulting solution is raised to the boil during a further 10 minutes. After about 30 minutes the solution becomes grey, and 3,340 litres of water are then added in the space of 10 minutes. The total duration of the hydrolysis is 4 hours. The hydrolysed material is filtered off, washed and preferably given an acid treatment in the presence of a titanous salt. The washed gel thus obtained is treated with mineralising agents and rutile-forming agents under the same conditions as in assignee's United States Pat. No. 3,169,074, as follows: The following solutions are added successively to 3000 kg. of washed $TiO_2$ gel (corresponding to 1,000 kg. of $TiO_2$), with constant stirring: 250 litres of a suspension of rutile-forming seed containing about 80 g./l. of $TiO_2$ (to supplement the seeds already added), 5,000 g. of zinc oxide suspended in 20 litres of water, 1,620 g. of monoammonium phosphate (about 1,000 g. of $P_2O_5$) dissolved in 7 litres of water, and 5,000 g. of potassium carbonate dissolved in 5 litres of water.

The product is dried and calcined at about 1000° C., while the rutilisation is followed by the change in the X-ray diagram. A pigment is obtained wherein the titanium dioxide is practically 100% present in the rutile form. The final pigment contains about 0.5% of ZnO.

The rutile-forming seeds used in this operation are seeds for calcination obtained from sodium titanate, according to assignee's United States Pat. No. 3,169,074.

EXAMPLE 2

16,000 litres of a titanium sulphate solution obtained by a sulphuric acid treatment of ilmenite are introduced into a hydrolysis vessel of about 27 m.³ capacity. The concentration of $TiO_2$ in this solution is 240 g./l. and its acidity factor is 1.95 to 1.97.

The mixture is heated to a temperature of 95° C. and 2.5% of rutile $TiO_2$ seeds (on the $TiO_2$ content of the titanium sulphate solution) are introduced (the rutile $TiO_2$ seeds are prepared separately in a vat by hot hydrolysis of a dilute partially neutralised titanium tetrachloride solution, giving a suspension containing 33 g./l. of $TiO_2$ as described in assignee's United States Pat. No. 3,169,074. The acidity factor of the suspension is 0.35 HCl per l. $TiO_2$). The seeds are introduced with stirring, in the space of 10 minutes, and the solution is raised to the boil during the same period. Boiling is continued until the titanium has almost completely precipitated, and at that moment a further volume of water equal to 18.5% of the starting solution is added and the precipitation is ended. The duration of the hydrolysis process is 4 hours. The hydrolysed product is filtered off and washed. The $TiO_2$ gel thus obtained can further be optionally purified by an acid treatment in the presence of a titanous reducing salt as in Example 1. The washed gel has $TiO_2$ seeds and Zn, P and K salts added to it as in Example 1, as follows:

The following are added successively to 3000 kg. of a suspension of the washed gel with continuous stirring:

250 litres of a rutile-forming seed suspension for calcination, prepared from sodium titanate as in assignee's United States Pat. No. 3,169,074,
10,000 g. of zinc sulphate dissolved in 20 litres of water,
1,620 g. of monoammonium phosphate dissolved in 7 litres of water,
5,000 g. of potassium carbonate dissolved in 5 litres of water.

The product is dried and calcined at about 1000° C. as in Example 1. The resulting pigment is 100% rutile. Analysis of the pigment shows its content of zinc to be about 0.5% ZnO.

We claim:

1. Process for the production of titanium dioxide in the rutile form, which comprises adding an aqueous suspension of rutile seeds to an aqueous solution of titanium sulphate, hydrolysing the titanium sulphate to form a hydrous titanium dioxide gel, washing the gel, adding to it a further aqueous suspension of rutile seeds and 0.1–2% of a zinc compound (reckoned as ZnO), 0.1–1% of an alkali metal salt (reckoned as $K_2O$) and 0.2–0.8% (reckoned as $P_2O_5$) of a phosphorus compound selected from the group consisting of phosphoric acid and water-soluble phosphates, all percentages being by weight and based on the titanium dioxide content of the washed gel, drying the gel and calcining it at a temperature of at least 850° C. unil it is completely converted into rutile titanium dioxide.

2. Process according to claim 1 wherein the calcination is carried out at a temperature of at least 1000° C.

3. Process according to claim 1 wherein the rutile seeds added before the hydrolysis are prepared in a different manner from those added after the hydrolysis.

4. Process according to claim 3 wherein the aqueous suspension of rutile seeds added before hydrolysis is prepared by the hydrolysis of titanium tetrachloride and the aqueous suspension of rutile seeds added after hydrolysis is prepared by heating titanium dioxide with sodium hydroxide solution and subsequently adding hydrochloric acid.

5. Process according to claim 1 wherein the total amount of rutile seeds added is between 1 and 6% by weight of the titanium dioxide to be calcined (calculated as $TiO_2$).

6. Process according to claim 1 wherein the alkali metal salt added is a potassium salt.

7. Process according to claim 6 wherein the potassium salt is potassium carbonate.

8. Process according to claim 1 wherein an ammonium phosphate is added to the hydrous titanium dioxide.

9. Process according to claim 1 wherein the zinc compound is a water-soluble salt decomposable to the oxide at the temperature at which the hydrous titanium dioxide is calcined.

10. Process according to claim 9 wherein the zinc salt is zinc sulphate.

11. Process according to claim 1 wherein the zinc compound is zinc oxide.

12. Process according to claim 11 wherein the zinc oxide is added as a suspension in water.

13. Process for the production of titanium dioxide in rutile form, which comprises adding an aqueous suspension of rutile seeds to an aqueous solution of titanium sulphate, hydrolysing the titanium sulphate to form a hydrous titanium dioxide gel, washing the gel, adding to it substantially simultaneously (1) a further aqueous suspension of rutile seeds, (2) 0.1–2% of a zinc compound (reckoned as ZnO), (3) 0.1–1% of an alkali metal salt (reckoned as $K_2O$), (4) 0.2–0.8% of a compound selected from the group which consists of phosphoric acid and water-soluble salts thereof (reckoned as $P_2O_5$), all percentages being by weight and based on the titanium dioxide content of the washed gel, drying the gel and calcining it at a temperature of at least 850° C. until it is completely converted into rutile titanium dioxide, the total amount of rutile seeds added between 1% and 6% by weight of the titanium dioxide in the gel (calculated as $TiO_2$).

References Cited

UNITED STATES PATENTS

| | | | |
|---|---|---|---|
| 3,169,074 | 2/1965 | Holbein | 106—300 |
| 3,337,300 | 8/1967 | Hughes | 106—300X |
| 3,341,291 | 9/1967 | Mabbs et al. | 106—300X |

FOREIGN PATENTS

| | | | |
|---|---|---|---|
| 659,648 | 3/1963 | Canada | 106—300 |

TOBIAS E. LEVOW, Primary Examiner

H. M. S. SNEED, Assistant Examiner